(12) United States Patent
Tada

(10) Patent No.: US 11,962,222 B2
(45) Date of Patent: Apr. 16, 2024

(54) IN WHEEL MOTOR LAYOUT AND DRIVE METHOD

(71) Applicant: Shigeki Tada, Hyogo (JP)

(72) Inventor: Shigeki Tada, Hyogo (JP)

(*) Notice: Subject to any disclaimer, the term of this patent is extended or adjusted under 35 U.S.C. 154(b) by 277 days.

(21) Appl. No.: 17/299,516

(22) PCT Filed: Mar. 31, 2020

(86) PCT No.: PCT/JP2020/015439
§ 371 (c)(1),
(2) Date: Jun. 3, 2021

(87) PCT Pub. No.: WO2020/226012
PCT Pub. Date: Nov. 12, 2020

(65) Prior Publication Data
US 2022/0060082 A1 Feb. 24, 2022

(30) Foreign Application Priority Data
May 7, 2019 (JP) .................................. 2019-097169

(51) Int. Cl.
*H02K 7/00* (2006.01)
*B60K 7/00* (2006.01)
(Continued)

(52) U.S. Cl.
CPC ............ *H02K 7/006* (2013.01); *B60K 7/0007* (2013.01); *H02K 19/103* (2013.01); *H02P 3/20* (2013.01)

(58) Field of Classification Search
CPC .......... H02P 21/30; H02P 21/20; H02P 21/22; H02P 1/04; H02P 1/163; H02P 1/26;
(Continued)

(56) References Cited

U.S. PATENT DOCUMENTS

2015/0158381 A1    6/2015  Shin

FOREIGN PATENT DOCUMENTS

| CN | 204774411 U | 11/2015 | |
| JP | 2004090793 A | * 3/2004 | ......... B60G 2202/25 |

(Continued)

OTHER PUBLICATIONS

Doctoral Dissertation; The 2014 Fiscal Year; "Study On Improving Performance of Direct Drive In-Wheel Motor for Electric Vehicle"; Graduate School of Media and Governance, Keio University; Shu Shimizu.

*Primary Examiner* — Antony M Paul
(74) *Attorney, Agent, or Firm* — BACON & THOMAS, PLLC

(57) ABSTRACT

The present invention relates to a layout and a drive method of an in-wheel motor used for driving a vehicle. In a vehicle using a direct drive in-wheel motor, there is a problem that mechanical loss is caused by a load on an axle due to a weight of a vehicle body, a direction change during traveling, and the like. A stator of the direct drive in-wheel motor is eccentrically disposed in a half peripheral part on the front side of the vehicle body. A terminal of a stator that generates a rotational torque reaction conflicting with a load applied to an axle during traveling is preferentially activated. A mechanical loss of a direct drive in-wheel motor due to a load on an axle during traveling of a vehicle is reduced.

1 Claim, 2 Drawing Sheets

(51) Int. Cl.
*H02K 19/10* (2006.01)
*H02P 3/20* (2006.01)

(58) Field of Classification Search
CPC ...... H02P 1/54; H02P 1/58; H02P 5/69; H02P 6/08; H02P 25/08; H02P 25/092; H02P 27/00; H02P 27/04; H02P 27/06; H02P 23/07; H02P 29/00; B60K 7/0007; B60L 50/51; H02K 16/00; H02K 19/103; H02K 7/006

See application file for complete search history.

(56) References Cited

FOREIGN PATENT DOCUMENTS

| | | |
|---|---|---|
| JP | 2009-234568 A | 10/2009 |
| JP | 5658883 | 12/2014 |
| JP | 2017-171251 A | 9/2017 |
| JP | 2017-185867 A | 10/2017 |

\* cited by examiner

IN WHEEL MOTOR LAYOUT AND DRIVE METHOD

TECHNICAL FIELD

The present invention relates to a layout and a drive method of an in-wheel motor used for driving a vehicle.

BACKGROUND ART

In the conventional in-wheel motor for an automobile, a structure is used in which a rotor and a stator are disposed around the entire periphery as in Non Patent Literature 1.

CITATION LIST

Non Patent Literature

Non Patent Literature 1: Shu Shimizu, "Study on Improving Performance of Direct Drive In-Wheel Motor for Electric Vehicle", Graduate School of Media and Governance, Keio University, p. 15, March 2015

SUMMARY OF INVENTION

Technical Problem

In a vehicle using a direct drive in-wheel motor, in other words, an in-wheel motor in which a rotor of a power motor is directly connected to a wheel rim of a wheel, since a rotation shaft of the power motor also functions as an axle, there is a problem that a load on the axle due to a weight of a vehicle body, a direction change during traveling, or the like will cause mechanical loss during motor rotation.

Solution to Problem

In a vehicle using a direct drive in-wheel motor, preferentially activated is a terminal of a stator that generates a rotational torque reaction conflicting with a load that is caused by a weight of a vehicle body and a direction change of the vehicle and that is applied to the axle during traveling.

The stator of the in-wheel motor is eccentrically disposed in a half peripheral part on the front side of the vehicle body.

Advantageous Effects of Invention

In a vehicle using a direct drive in-wheel motor, the rotational torque reaction of the motor is also transmitted to the axle and the vehicle body via the stator. Therefore, by preferentially activating the terminal of the stator generating the rotational torque reaction that conflicts with the load applied to the axle when the vehicle is traveling so that the load is offset, it is possible to reduce the load on the axle that causes mechanical loss.

The conventional in-wheel motor such as the motor disclosed in Non Patent Literature 1 has a structure in which a stator is disposed around an entire periphery of a rotor. In contrast, in the invention of the present application, since a stator of a direct drive in-wheel motor mounted on a wheel is intensively disposed in the half peripheral part on the front side of the vehicle, the rotational torque during forward traveling generates an upward reaction on the stator side. On the other hand, in the half peripheral part on the rear side of a vehicle body, the rotational torque is not generated, and a downward reaction does not occur. Therefore, a weight of the vehicle is offset by such action, and the load on the axle can be reduced.

DESCRIPTION OF EMBODIMENT

Figure 1:
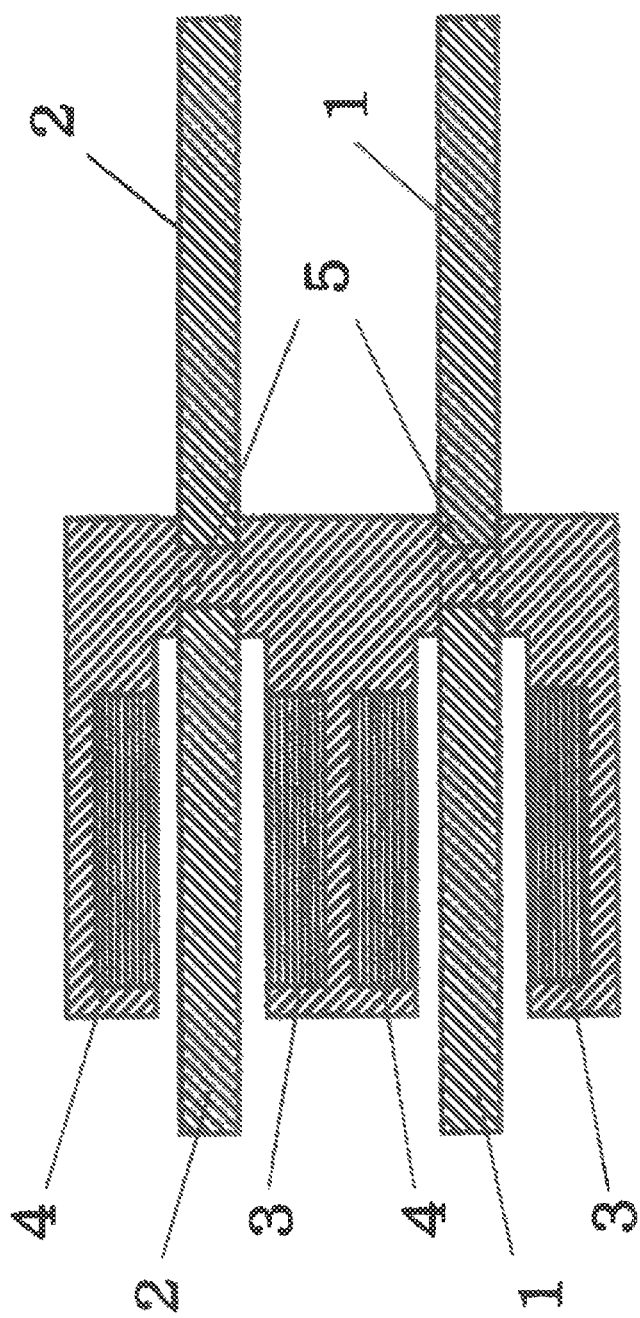
FIG. 1 is a cross-sectional view of a motor structure in which a stator is eccentrically disposed on the front side of a vehicle.

FIG. 1 is a cross-sectional view illustrating an example of a layout where two motors are attached to a wheel in parallel. The left side in FIG. 1 corresponds to the front side of a vehicle, and the right side is the rear side. Coils of two pairs of left and right stators (3) and (4) disposed on both side surfaces of rotors (1) and (2) are disposed only in half peripheral parts on the front side of the vehicle body.

Either one of the two motors of FIG. 1 may be omitted.

In a case where switched reluctance motors are used as the motors in FIG. 1, when the vehicle tunas right forward or turns left backward, an output of a left-side stator (3) is decreased and an output of a right-side stator (4) is increased in proportion to a turning angle. Similarly, when the vehicle turns left forward or turns right backward, the output of the right-side stator is decreased and the output of the left-side stator is increased. When such a drive method is used to incline a vector of a rotational torque received by the rotors in a horizontal traveling direction with respect to the rotors' rotational planes, a load of the horizontal distortion on the axle that cannot be absorbed by the wheel at the time of turning the vehicle body is offset and alleviated.

Figure 2:
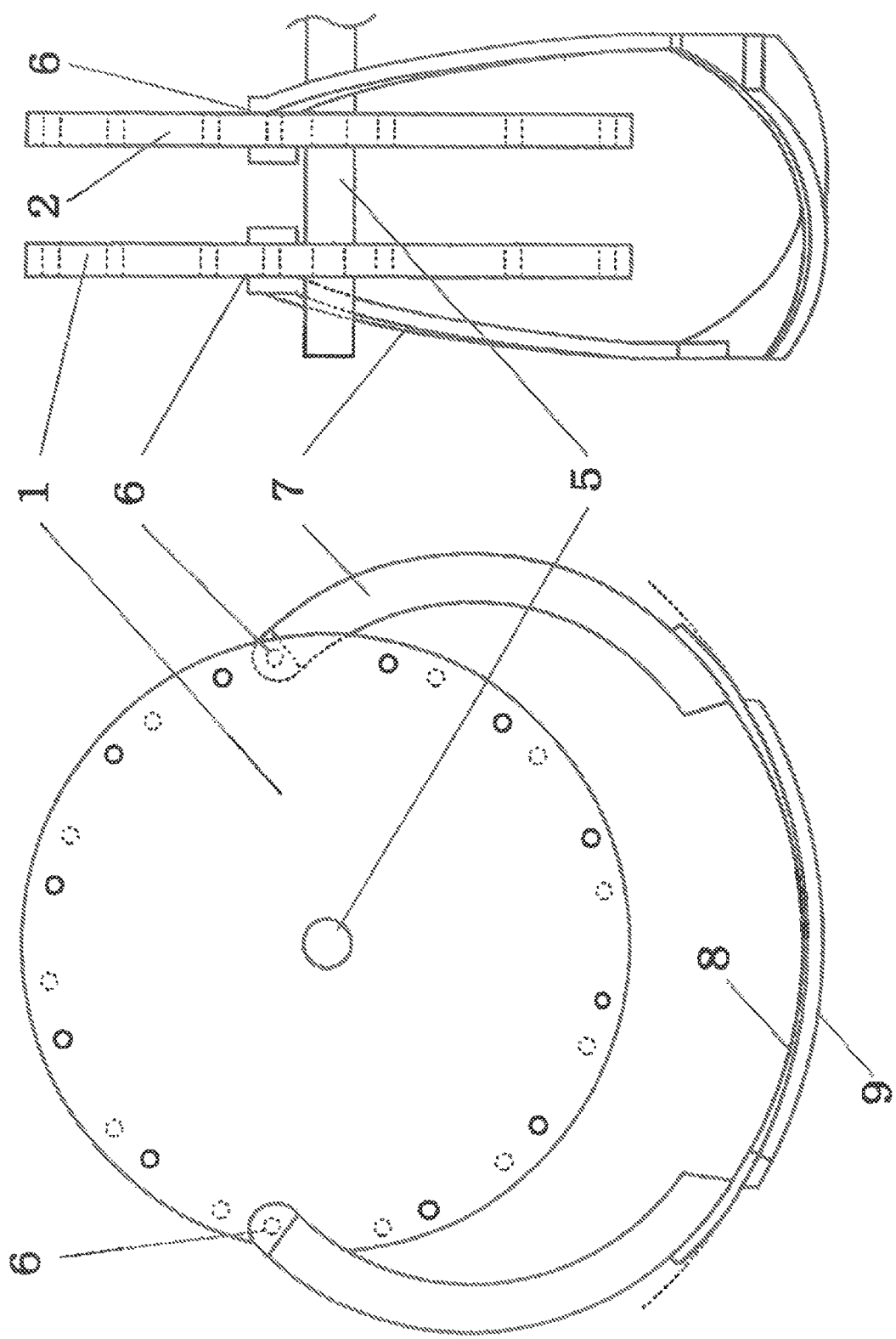
FIG. 2 is a side view and a rear view of a wheel structure in which a mechanism of a shock-absorbing device is incorporated in an outer peripheral part of a rotor.

FIG. 2 shows an embodiment of a wheel in which an expansion and contraction mechanism based on deformation of a leaf spring and rotation of the two rotors is incorporated in an outer peripheral part of the rotor. The two rotors (1) and (2) sharing a rotation shaft are connected to each other by a U-shaped arm (7) via a hinge (6). Due to deformation of an arched leaf spring (8) along a circumference of the wheel, the arm is bent at the arm's central portion. The leaf spring also serves to maintain a shape of a tread, and a rubber tread (9) is attached to an outer surface of the leaf spring. The arms are connected to the outer peripheries of the two rotors at equal intervals such that a plurality of leaf springs and treads are arranged in a spiral manner to surround the entire periphery of the wheel. For the sake of description, FIG. 2 illustrates a state where only one set of an arm, a leaf spring, and a tread is attached to the two rotors.

REFERENCE SIGNS LIST 1 outer rotor
2 inner rotor
3 left-side stator
4 right-side stator
5 axle
6 hinge
7 arm
8 leaf spring
9 tread

The invention claimed is:
1. A drive method of an in-wheel motor in an electric vehicle using a direct drive in-wheel motor, the drive method comprising:
preferentially activating a terminal of a stator that generates a rotational torque reaction conflicting with a load that is caused by a weight of a vehicle body and a direction change of the electric vehicle and that is applied to an axle during traveling.

* * * * *